Patented Mar. 11, 1924.

UNITED STATES PATENT OFFICE.

CARLETON ELLIS, OF MONTCLAIR, NEW JERSEY, AND MORTIMER J. COHEN, OF NEW YORK, N. Y., ASSIGNORS, BY MESNE ASSIGNMENTS, TO SETH B. HUNT, TRUSTEE, OF MOUNT KISCO, NEW YORK.

ALCOHOL, ETC., AND PROCESS OF MAKING SAME.

No Drawing.     Application filed April 25, 1918. Serial No. 230,679.

*To all whom it may concern:*

Be it known that we, CARLETON ELLIS and MORTIMER J. COHEN, citizens of the United States, and residents of Montclair, county of Essex, and State of New Jersey, and New York, county of New York, and State of New York, respectively, have invented certain new and useful Improvements in Alcohols, Etc., and Processes of Making Same, of which the following is a specification.

This invention relates to alcohols and other products of value derived from unsaturated hydrocarbons of petroleum and other materials containing saturated and unsaturated hydrocarbons, and to a process of making such products.

According to the present invention hydrocarbon material containing saturated and unsaturated hydrocarbons, as, for example, cracked petroleum material, shale oil and the like, is treated with a preferably acid extracting or concentrating agent, as sulfuric acid, for example, under conditions whereby the unsaturated hydrocarbons present, or at least a substantial proportion thereof, are extracted by the acid and reactive acid liquor obtained, which is substantially immiscible with saturated hydrocarbon material present and is readily separated therefrom, as by settling, centrifuging or the like operation, and which extract or liquor is adapted to be used for the production therefrom of products of value preferably containing oxygen. For example, by reacting on the reactive acid liquor with a hydrolyzing agent, mixtures of alcoholic material may be obtained substantially corresponding to unsaturated hydrocarbons—largely olefines of the general formula $C_nH_{2n}$ and having more than two carbon atoms—present in the hydrocarbon material treated. Mixtures of acetates or other esters, and numerous other derived products of value, may be obtained by appropriate treatment of the reactive acid liquor.

Sulfuric acid is an available commercial material well adapted for the acid treatment of hydrocarbons by the present process, but other, preferably acid extracting or concentrating agents, yielding an extract or concentrate substantially immiscible with saturated hydrocarbons, may be used, as, for example, other polybasic (diabasic, tribasic, &c.) acids, preferably mineral acids, or mixtures thereof may sometimes be used, as mixtures of selenic acid or phosphoric acid with sulfuric acid and the like. We shall describe more especially the use of sulfuric acid as an extracting or concentrating agent for unsaturated hydrocarbons, but without limitation thereto. The liquor obtained by extraction of unsaturated hydrocarbon material with diabasic acid, such as sulfuric acid, or other polybasic acid material, in accordance with our invention, is normally of an acid character, which appears to be advantageous in carrying on subsequent operations and treatments therewith.

Not all materials containing unsaturated hydrocarbons are equally well adapted for the production of an extract adapted to give good yields of valuable materials, such as alcohols, acetates, etc. Other things being equal, of course, such materials containing the highest percentage of unsaturated hydrocarbons are preferably to be used, but in some cases materials rich in unsaturated hydrocarbons are substantially unsuited for the purposes of our invention, as may also be the case even where the unsaturated hydrocarbon content is relatively low. Gasolene, for example, which has been produced by drastic cracking has a tendency to spontaneously form polymers of unsaturated hydrocarbons on standing. A thick molasses-like body sometimes separates from the light hydrocarbons and, being non-volatile, is not infrequently very troublesome. (See Ellis and Wells J. Ind. Eng. Chem. 1915, 1029). Material of this general character, which may be described as over-cracked, when subjected to the ordinary laboratory test for determining unsaturation, (which consists in shaking up a small quantity with an excess of concentrated or fuming sulfuric acid, in a test tube, measuring cylinder, or the like, and when the material is settled or centrifuged, making an approximate determination of the unsaturated hydrocarbon content by observing the decrease in the gasolene layer), may show a comparatively high percentage of unsaturated material, without, however, being well adapted for the purposes of the present invention. The action of sulfuric acid with such highly reactive or spontaneously-polymerizing hydrocarbons is violent, and in practice we prefer a grade of gasolene which, while preferably containing a substantial portion of unsaturated bodies, has present no excessive amounts of spontaneously-polymerizing hydrocarbons.

A good test for determining the adaptability of hydrocarbon material containing unsaturated hydrocarbons for use with the present invention, may be made by treating a sample of the hydrocarbon material with sulfuric acid of about 1.8 specific gravity, preferably in considerable excess over what is required to take up the unsaturated hydrocarbon content of the oil, maintaining the temperature at about 20° C. to 30° C. Material which reacts violently, chars readily or yields large quantities of tar under such treatment, is ordinarily not well adapted for use with this invention, but in some cases may be utilized by special treatment, as, for example, by resorting to step by step extraction or by giving it a preliminary sludging treatment such as is commonly carried out in oil refining, with a small quantity, say about one-half of one per cent, of concentrated sulfuric acid, permitting the temperature to rise, whereby more highly reactive unsaturated bodies, as acetylenes and the like, are sludged off and may be run to waste, prior to treatment under sulfating conditions for the production of acid extract adapted to yield products of value.

One material adapted for use with our invention may be obtained by taking the light fraction, boiling mainly up to about 100–120° C., of "Burton oil" obtained by cracking heavy portions of crude petroleum oils and petroleum residues of various kinds under a pressure in the neighborhood of about 75 pounds to the square inch and containing about 15–20% of unsaturated hydrocarbons. Acid liquor made from this material gives substantially good yields of products of value, such as alcoholic material.

Another material well adapted for use with the present invention consists of the light liquid obtained by liquefaction of vapors from petroleum stills and produced more especially when cracking is being carried on in at least some of the stills from which the vapors are collected and liquefied. Such vapors may be liquefied by compression and cooling, or by efficient cooling of the condenser without compression, or by absorption in heavier oils with or without subsequent separation therefrom, as by fractional distillation, or in other ways. Such material usually boils mainly under about 100° C., and a very substantial proportion of its unsaturated content may be extracted, and from the acid liquor good yields of alcohols, &c., may be obtained. The light naptha made by liquefaction of still vapors of petroleum and some light fractions of cracked gasolene appear to contain a fairly high proportion of relatively stable olefines of simple character producing acid liquor adapted for giving relatively high yields of products of value, such as alcohols, and unsaturated hydrocarbons of this general character and adapted for making acid liquor giving high yields of alcohols, &c., are referred to in certain of our claims, for purposes of identification, as "simple, normal olefines."

The foregoing materials are referred to by way of example only, and other suitable materials may, of course, be used, and materials and fractions may be prepared or chosen adapted for the production of acid liquor from which desired products, such as alcohols, &c., may be obtained. For example, when considerable proportions of low boiling alcohols are desired to be produced, light unsaturated hydrocarbons in gaseous or vaporous form at ordinary temperatures and pressures are utilized, preferably mixed with or absorbed in a diluent of liquid paraffin hydrocarbon material, while for the production of higher boiling materials, heavier unsaturated hydrocarbons are used.

By the present invention sulfuric acid, which is preferably somewhat diluted, is used in sufficient quantities to extract olefines and similar unsaturated hydrocarbons, and the action of sulfuric acid on the unsaturated hydrocarbons treated is controlled so that it is carried on under sulfating conditions, that is to say, so that the action which takes place is directed as far as practicable, to the production of sulfated derivatives of unsaturated hydrocarbons, yielding reactive acid liquor substantially immiscible in residual hydrocarbon material and adapted for replacement of sulfuric acid by other materials, groups or radicals to yield products of value. Mixtures of alkyl hydrogen sulfates may be formed substantially corresponding to mixtures of unsaturated hydrocarbons present, and there may also be some of the unsaturated hydrocarbons which are absorbed or dissolved. More or less generally undesirable chemical reactions of various kinds usually take place during extraction by sulfuric acid, especially with highly reactive or unstable bodies present, as, for example, some sulfonation and polymerization of unsaturated hydrocarbons, and a part of the unsaturated hydrocarbon material may remain unextracted, but so long as a substantial proportion of the unsaturated hydrocarbon material present is extracted in the form of reactive acid liquor of the general character above referred to, containing substantial proportions of sulfated derivatures of olefines and corresponding in a general way to unsaturated hydrocarbons of the hydrocarbon material taken for treatment, such extracted material may be utilized for the purposes of the present invention.

Viewed as a chemical reaction, but without limitation beyond what has been expressed, sulfation of the mixtures of unsaturated hydrocarbons to yield mixtures of alkyl hydrogen sulfates may be expressed in a general way as follows:

"R" and "R'" representing a variety of alkyl radicals present in the mixtures of unsaturated hydrocarbons, and ":" representing the assumed double bonding of carbon atoms. In some cases but one of the radicals R, R', may appear. Reaction may take place, of course, of more complicated character than can be expressed in this simple form, as, for example, there may be some production of alkyl hydrogen sulfates having more or less carbon atoms than the unsaturated hydrocarbons from which formed, and neutral alkyl sulfate may be formed to some extent, &c.

The control of the acid treatment so that sulfating conditions may be maintained is of importance. In commercial practice in treating material such as Burton oil, for example, we prefer to use sulfuric acid of about 1.8 specific gravity (87% acid), which may be obtained, for example, by water dilution of the ordinary commercial acid of 66 Bé. or of about 1.84 specific gravity. Where in our specification and claims we refer to sulfuric acid of 1.84 specific gravity we use this expression as a convenient designation for ordinary commercial concentrated sulfuric acid commonly described as 66° Bé. acid. When using acid of about 1.8 specific gravity with such hydrocarbon material, good results will ordinarily be obtained if the temperature is maintained at about 20° C., the reactive acid liquor produced under such conditions being well adapted for yielding products of value. In some cases weaker or stronger acid may be used and higher or lower temperatures. In general, more especially when the entire extraction is made in one step, if stronger acid is used, lower temperatures should be maintained, and if weaker acid is used the temperature may be higher. Cold sulfuric acid of about 1.57 specific gravity has substantially no solvent or reactive effect on olefines or analogous unsaturated hydrocarbons, and the acid used for making reactive acid liquor, particularly when cooling is resorted to, should therefore be of gravity above 1.57. In effecting the desired control, cooling coils and agitation may be utilized, and we find that it is usually desirable to add the acid slowly to the hydrocarbon material, and that unduly prolonged exposure of the unsaturated hydrocarbon material to the action of comparatively strong sulfuric acid is preferably to be avoided. The acid may be added in sub-divided state, as by spraying it into the gasolene or other hydrocarbon material, and the acid may be chilled or even frozen. Extraction may be carried out in successive steps, preferably at successively increasing temperatures, the acid extract being preferably separated after each step before additional sulfuric acid is added, or, if desired, all or substantially all of the unsaturated hydrocarbon material extracted may be removed in one operation, an excess of acid being preferably used. The presence of a substantial proportion of inert diluent material, as saturated hydrocarbons, may have a beneficial effect in reducing or minimizing undesirable local reactions, such as extensive polymerization of unsaturated hydrocarbons and the like. It will be understood that the purpose of the various features of control during the acid treatment is to insure that such treatment be carried out under sulfating conditions, whereby unsaturated hydrocarbons are collected or concentrated by the acid, providing reactive acid extract substantially immiscible in residual hydrocarbon material and adapted to yield products of value, and that it is not essential in all cases to utilize all the various modes of control, and that variations in the means or elements of control may be resorted to.

It is an economy and preferably a desideratum to obtain acid liquor or extract in which substantially a maximum quantity of unsaturated hydrocarbon material is taken up by the sulfuric acid. The specific gravity of the unsaturated hydrocarbon material is lower than that of the sulfuric acid, so that the greater the extraction of the unsaturated hydrocarbon material by the sulfuric acid, the less the specific gravity of the resulting acid extract, and vice versa. Hence the extent to which the unsaturated hydrocarbon material has been taken up by the sulfuric acid may be easily determined by noting the reduction of specific gravity of the acid extract. The best results are usually to be obtained by making use of an amount of acid somewhat in excess of that required to extract unsaturated hydrocarbons present, but the use of so much of the acid or other extracting agent is not essential in all cases. Pure or substantially pure unsaturated hydrocarbon material, or concentrate of unsaturated hydrocarbons, is obtained accompanying the alcoholic materials produced upon hydrolysis of the acid extract, and such material obtained in this way or other ways may be incorporated with extracted liquor in order to bring the unsaturated hydrocarbon content thereof up to or toward the maximum amount capable of being taken up by the sulfuric acid, or such unsaturated material may be added to subsequent quantities of liquid hydrocarbon material taken for sulfation treatment. With hydrocarbon materials well adapted for extraction treatment, a reduction of the specific gravity of the acid extract or liquor, as unsaturated hydrocarbon material is taken up, may be economically and practically obtained, from, say, 1.8 specific gravity sulfuric acid used to extract of gravity ranging from about 1.5 down to about 1.2, or perhaps in some cases even lower, and acid liquor within about this range of gravities has been found useful with our invention, and separates readily from unextracted hydrocarbons, by simple gravity settling as a rule, so that commercial operations can be carried out quickly and effectively. There may, of course, be more or less variations either way from the precise figures given above.

The acid extract or liquor is substantially immiscible in the saturated hydrocarbons present, and which ordinarily constitute the bulk of the gasolene or other material taken for treatment, and is materially higher in specific gravity than such saturated hydrocarbon material. By reason of these characteristics such acid extract or liquor can be readily separated from the residual material consisting principally of saturated hydrocarbons with more or less unsaturated hydrocarbon material, &c., which may be left unextracted, as by means of settling, centrifuging and the like operation. In this way distinct advantages of operation are secured which would not obtain if the extract were miscible with such residual material. Where sulfonated bodies are produced, for example, they appear to be miscible, at least to a substantial extent, with the saturated hydrocabron material and can be separated only with considerable difficulty, whereas with the acid extract of the present invention mechanical separation is easily and efficiently carried out and a reactive acid liquor obtained substantially free from saturated hydrocarbon material, though more or less of the latter, may, of course, be entrained therewith. The tendency of the acid extract or liquor to entrain hydrocarbons varies to a considerable extent with the temperaure. At temperatures around 0° C., for example, its fluidity is comparatively low and a considerable amount of hydrocarbons may be entrained. When the temperature is somewhat higher, however, say about 15–20° C., much less entrainment of saturated hydrocarbons will take place and substantially complete separation may be effected. The acid extract may be centrifuged, or air may be blown through it, or it may be exposed to reduced air pressure or partial vacuum or otherwise treated to free or partly free it from entrained hydrocarbons which can be separated or eliminated in such manner.

The liquid hydrocarbon material remaining after withdrawal of the extract, on being washed and given further appropriate distillation or other treatment, yields high grade naphtha, gasolene, &c., much cleaner and freer from unsaturated components than is the case where ordinary refining treatment is carried out. Such material is well adapted for a variety of uses, being free from all or the major portion of those unsaturated bodies which cause trouble in internal combustion engines, or when the gasolene is used as a degreasing or extracting or cleaning medium, tend to oxidize and become fixed in the material or garments, &c., being cleaned and give the same a bad odor and a poor color.

For making the acid extract or liquor from gasolene or other liquid material containing unsaturated hydrocarbons, such material may be placed in a vessel equipped with an agitator, and the acid may be added thereto preferably slowly and preferably in a sub-divided state, as by spraying or the like, while agitation is preferably being carried on to secure thorough admixture and preserve substantially equable temperature throughout the material, the material preferably being kept at a low temperature, say from 10 to 20° C. by provision of refrigerating means, such as a cooling coil, or by the provision of the container with a cooling jacket, and the rate of supply of the acid preferably being regulated so that the temperature does not become unduly high. After the acid supply has been cut off, the agitation is preferably continued for an interval, after which the material may be contrifuged and separated, or the extract may be allowed to settle and withdrawn from the bottom of the vessel. Where the stream is visible through a "look box" or similar device, the difference in appearance is readily noted between the acid extract or liquor, which, when made from Burton oil, for example, is usually reddish brown in color, and the light colored gasolene or other residual hydrocarbon material, and a close and accurate "cut" can be made.

While mixing in the order stated, namely gradual addition of acid to the gasoline or other material containing unsaturated hydrocarbons, is desirable and essential in some cases, we do not restrict ourselves herein to the precise order of mixing, at least in the broader phases of the invention, as with some materials and conditions we may mix all together and agitate, or add the unsaturated hydrocarbon material to the acid suitably chilled or frozen etc., or in some cases the material containing saturated hydrocarbons and unsaturated hydrocarbons may be brought into contact with the acid in various other ways, as, for example, such materials, together with the acid, may be passed or sprayed, as by atomizers, over baffles, the temperature, time interval and strength of acid, etc. being preferably adjusted to the particular material under treatment, whereby the treatment is carried on under sulfating conditions, as already explained.

The characteristic of substantial immiscibility of the acid liquor in saturated hydrocarbon material is of great importance, as it affords a simple method of separation procedure, especially when dealing with materials containing only small proportions of unsaturated hydrocarbons.

Partial separation may be sufficient, however, in some cases, as, for example, acid liquor to be used for the production therefrom of mixed solvents containing saturated hydrocarbons, such as gasolene and the like, may contain such saturated hydrocarbons in desired proportions, according to the composition of the solvent material to be produced.

Oil gases and vapors produced in distillation and cracking operations, etc., which have been heretofore wasted, or at the best simply used for fuel purposes, may be mixed with and absorbed in heavier oils, as already pointed out, or may be passed into sulfuric acid to form sulfated products of lower molecular weight than is ordinarily obtained from the unsaturated gasolene fractions. At the same time a certain amount of polymerization progresses, producing a greater or less quantity of oils, and the presence of such inert diluent material, consisting of oils from this or other sources, appears to be of advantage in securing efficient extraction and the production of fluid sulfated extract of good quality.

The temperature, strength of acid used, etc., are regulated in substantially the manner already described, so that the extraction is carried out under sulfating conditions and undesirable formation of sulfonated bodies, tars and the like is reduced to substantially the minimum.

The reactive acid liquor is treated for the production therefrom of products of value preferably containing oxygen. Hydrolysis will be described as one example of such treatment. The hydrolyzing agent may be water or substantially aqueous solution, including saline solutions, such as brine, solutions of sodium sulfate, and the like, dilute acid solutions, alkaline solutions, or the water may be wholly or partly in the form of water vapor or steam, or other hydrolyzing material may be used, as, for example, in some cases it may be possible to make use of solid bodies adapted to yield water on reaction with sulfuric acid, such as calcium hydrate or salts containing water of crystallization, such as Glauber's salt and the like. Hydrolyzing with water will be described, but this is not to exclude the use of other hydrolyzing agents. The hydrolyzing material may contain alcohols, as, for example, when water containing alcohols is produced as hereinafter described, it may be used for hydrolyzing subsequent quantities of acid extract. When water is used for the hydrolyzing agent, the amount of water may vary within fairly wide limits, though the use of water of about two to three times the amount of the acid extract or liquor is deemed preferable. The extract is preferably added fairly slowly to the water and with continued agitation to secure thorough mixing, but may be incorporated therewith in other ways. A lead-lined still is preferably used because of the presence of diluted sulfuric acid. The admixture of the extract with the water or other hydrolyzing agent may be made in the still, or one or more vessels or tanks, preferably lead-lined, may be used for this purpose. The provision of such separate mixing tanks or vessels is desirable in order to afford additional flexibility of plant operation. Highly excessive quantities of water are preferably avoided so that distillation may be performed economically and to prevent undue dilution of the sulfuric acid and difficulty in its concentration and recovery. Upon admixture with water and permitting the material to stand for a time, a light layer usually rises to the surface. Yields of alcoholic material may be obtained to some extent by distilling such layer if the same should be treated separately, and alcoholic material so obtained may be combined with that obtained from distillation of the acid extract with the hydrolyzing material, as water, or distillation may be performed without separating the light material.

The distillation may be carried on dry, as by means of a steam coil or jacket or other suitable apparatus, but preferably live steam is used at least in the later stages, and in this case the amount of water may, of course, be reduced. The distillate which comes over with the steam may be divided into two parts, one consisting of the mixtures of water-insoluble alcohols produced together with hydrocarbon materials which may be present, and the other consisting principally of water. When the material taken for treatment contains light unsaturated hydrocarbons, the water may contain more or less soluble or partially soluble alcohols and mixtures thereof dissolved therein. Slightly soluble alcohols may be separated, as by salting out from the water, for example. More completely soluble alcohols may be recovered from the water in any suitable way, as by fractional distillation, and the mixtures of insoluble alcohols may be purified or rectified in any desired way. Or the water containing alcoholic material may be used over and over for hydrolyzing fresh quantities of acid extract, and in this way separate treatment may be avoided for recovery of the alcoholic content, except, in some cases, at relatively long intervals.

Hydrolysis probably takes place, to some extent at least, upon the admixture of acid extract with water and may be substantially complete upon heating the mixture or by adding the extract to hot water, but preferably the simple procedure is followed by adding the extract to water at any convenient temperature and heating until the alcohols are distilled over. The reaction which takes place, more particularly in the production of secondary alcohols (alcohols containing the group CHOH), it is believed may be expressed in a general way as below, but it is to be understood that such expression is given only for the purpose of affording a general understanding of a simple form of reaction which is believed to take place, and not for the purpose of limitation:

$$RCH_2CHHSO_4R' + H_2O \rightarrow RCH_2CHOHR' + H_2SO_4$$

(R and R' representing alkyl radicals, but one of which may be present in some cases). As an example of other types of somewhat more complicated reaction which may take place, there may be more or less linking together of carbon atoms from different bodies or more or less splitting off may take place with resulting differences between the number of carbon atoms in the unsaturated hydrocarbons and in the alcohols obtained.

Where water is used as the hydrolyzing agent, sulfuric acid is regenerated in the hydrolyzing still, and the material which remains in the still, after the distillation with steam is completed, consists of dilute sulfuric acid and more or less generally heavy material of various kinds which is not carried over with steam at about atmospheric pressure, which is preferably used, but higher or lower pressures may be used, if desired. These separate into two layers. The layer of dilute acid may be drawn off and concentrated for re-use, if desired, or otherwise disposed of. By concentrating the acid a substantial proportion thereof may be used over and over again, and operating expenses for acid may be kept within fairly low limits, or the acid may be partially reconcentrated and mixed with fresh quantities of strong acid to dilute the latter to the desired degree for use in treatment of fresh quantities of hydrocarbon material. Since, ordinarily, concentration of acid to above 1.8 specific gravity is not required, concentration of acid for reuse may be comparatively readily and inexpensively accomplished.

The alcohols and mixtures thereof which distill over are usually accompanied with a proportion of hydrocarbon material, principally mixtures of unsaturated hydrocarbons. Such unsaturated hydrocarbon material may be simply absorbed or carried along in the process, or it may be that the same or portions thereof are regenerated from the acid liquor in the process of hydrolyzing, or perhaps the presence of unsaturated hydrocarbon material may be accounted for in still other ways. With different materials and conditions there are considerable variations in the proportion of such hydrocarbon material obtained. It has been found further that the production of unsaturated hydrocarbon material with the alcohols usually persists, that is to say, if the unsaturated hydrocarbon material so obtained be treated with sulfuric acid and the resulting extract hydrolyzed, the alcoholic material obtained will also usually be accompanied by unsaturated hydrocarbons.

The crude distillate from the hydrolyzing still may be rectified by redistillation. The unsaturated hydrocarbons boil generally at lower points than the alcoholic material produced, and upon such redistillation the lightest material coming over may consist almost entirely of unsaturated hydrocarbons with possibly small quantities of alcohols. The higher boiling portions obtained from distilling the crude alcoholic material, while they may contain more or less unsaturated hydrocarbons, consist principally of the alcohols which are usually of higher boiling points than the unsaturated hydrocarbons. Between the two there is usually a range in which the boiling points are close together or overlap and mixtures of unsaturated hydrocarbons and alcohols are obtained in varying relative proportions. Separation by fractional distillation is difficult with such material, but separation may be simply and readily effected in the following manner.

We have found that sulfuric acid diluted with water to about 1.57 sp. gr. dissolves or absorbs the alcohols produced, in the manner described, from light cracked material such as Burton oil, for example, but hydrocarbons are not dissolved or absorbed thereby to any considerable extent. This characteristic action may be utilized to effect a substantial separation between the alcohols and the hydrocarbon material. For example, in order to substantially purify the alcohols and remove or substantially remove hydrocarbon materials therefrom, sulfuric acid diluted with water to substantially 1.57 specific gravity may be mixed with the alcohol-containing material and centrifuged or allowed to settle. The sulfuric acid, with the alcohols dissolved or absorbed thereby, may then be separated from hydrocarbons which form a layer at the top, and after effecting such separation, and upon further diluting the solution of the alcohols in the sulfuric acid, as by adding water, the major portion of the alcohols, being no longer soluble in the weak acid solution, rise to the top and may be readily separated. Any remaining alcohols dissolved in the weak acid solution may be recovered by fractional distillation. The separation may be performed in other ways, utilizing the selective solvent action of sulfuric acid of about the strength named.

This method of refining the alcohols by separation with sulfuric acid of about 1.57 specific gravity is especially useful in the case where unsaturated hydrocarbon materials are present which boil within the range of alcohols produced. Such material cannot readily be separated by ordinary fractional distillation procedure. While this method of separation is preferably applied to the fraction intermediate between the fractions readily separable by fractional distillation, it may be applied to the entire crude distillate obtained from the hydrolyzing still, or to other mixtures of alcohols with unsaturated hydrocarbons and other bodies not soluble in sulfuric acid of the specific gravity of about 1.57.

The unsaturated hydrocarbon material obtained in pure or substantially pure form, or at least in the form of a concentrate, in the ways above described, or in other ways, may be made use of in any desired manner, but preferably it is used for bringing new quantities of acid extract up to the desired strength, or added to new material to be extracted, thereby making a substantially cyclic process in which the unsaturated hydrocarbons are ultimately substantially all converted into alcohols without the necessity of separate treatment therefor.

The unsaturated hydrocarbons present in hydrocarbon material such as oil gases and vapors, and light gasolene obtained by cracking heavier oils, and also in shale oil and the like, and which are available for the purposes of the present invention, are principally of three carbon atoms and upward, and the olefines utilized may range through propylene, butylene, amylene, hexylene and higher olefines, and besides straight chain olefines, various forms of iso-olefines may be present, and there may be still other forms of unsaturated hydrocarbons present.

The alcohols and mixtures of alcohols produced in accordance with our invention may be generally identified as alcohols or mixtures of alcohols derived from and substantially corresponding to unsaturated hydrocarbons of hydrocarbon material, such as products obtained by cracking petroleum, shale oil and the like, and may comprise alcohols and mixtures of alcohols varying through a wide range. Such range corresponds in a general way to the range of unsaturated hydrocarbon material available, with, however, various such exceptions to close or accurate correspondence as are naturally to be expected in dealing with such complex materials, some of which exceptions or variations have been pointed out, and there may, of course, be still others in addition to those above referred to. The alcohols appear to be principally simple monohydric alcohols, having but one OH group, and containing only the elements of carbon, hydrogen and oxygen and may comprise propyl and butyl, amyl, hexyl, heptyl, and so forth alcohols. Cyclic alcohols may also be obtained in some cases. In some cases more or less unsaturated alcohols may be present, and generally the alcoholic material, even when fairly well refined, responds to a greater or less extent to tests for unsaturation. The boiling points, &c., usually indicate that secondary alcohols predominate over the other forms of alcohols which when present, are usually in proportionately smaller quantities. The lower alcohols, such as iso-propyl alcohol, for example, appear readily to form hydrates with water, and the presence of such hydrates may have more or less effect on boiling points.

When heated with somewhat diluted sulfuric acid, the alcohols derived substantially in the manner described from unsaturated hydrocarbons, and consisting largely of secondary alcohols, are largely converted back into unsaturated hydrocarbons and polymers thereof, being apparently more easily dehydrated than alcohols containing mainly primary alcohols, as, for example, ordinary fusel oil obtained from whiskey distillation and the like.

The following examples are given for affording an understanding of specific applications of our process to certain materials, and not for limitation of the invention.

Example 1. Various heavy petroleum fractions were cracked in a pressure still of the "Burton" type at about 75 pounds pressure and the distillate condensed under substantially still pressure. The resulting material was redistilled or "re-run" at substantially atmospheric pressure. A cut of this liquid re-run material was taken boiling mainly up to about 110° C. and containing a small percentage boiling up to about 150° C. It was soluble in sulfuric acid of 1.8 specific gravity to the extent of about 16.5%.

About 1037 gallons of this material were introduced into a churn having a cooling coil and provided with an agitator having a vertical shaft equipped with blades arranged at an angle to force the liquid upwardly and rotating at approximately eighty turns to the minute. About 173 gallons of sulfuric acid of 1.8 specific gravity were introduced into the oil, its addition extending over a period of about three hours, during which time agitation was carried on. The temparature of the contents of the churn was kept at about 12° to 15° C. by means of the cooling coil. It was found that sufficient temperature control could be effected by means of the brine pump, the acid being added at substantially a constant rate and the brine pump being speeded up as the temperature rose somewhat and being partially shut off when the temperature fell. In this way substantially automatic temperature regulation may be maintained, as by means of thermostatically operated control means for the refrigerating apparatus.

After the acid was added, the agitation was continued for about one hour and ten minutes and the material was permitted to settle for about thirty minutes after the agitation had been stopped, and the acid extract was then drawn off from the bottom. About 283 gallons of acid extract or liquor were obtained of about 1.4 specific gravity, showing an extraction of about 110 gallons by the 173 gallons of sulfuric acid used.

This acid liquor was run into a lead lined tank containing water to about twice the amount of the extract and thoroughly mixed therewith, and was thence run into a lead lined hydrolyzing still and upon distillation, by means of a steam coil and live steam introduced directly into the still, yielded a condensate of about 90 gallons of crude water-insoluble alcohols and about 90 gallons of water which were found to contain about 4.5 gallons of alcohols. In the hydrolyzing still there remained, in addition to dilute sulfuric acid, a surface layer consisting of about 44 gallons of material non-volatile with steam at atmospheric pressure. The 90 gallons of crude alcohols were found to contain substantially 68.4 gallons of refined alcoholic material and substantially 8.1 gallons of unsaturated hydrocarbons in practically the pure state, giving a yield with a single extraction (including the unsaturated hydrocarbons which can be substantially converted into alcohols) of slightly over 7.8% of the gasolene treated and about 47.3% of its unsaturated content soluble in 1.8 sulfuric acid.

The gasolene remaining after the first extraction was reextracted with about 70 gallons of sulfuric acid of 1.8 sp. gr. under substantially the same conditions as in the first extraction, the temperature range being slightly higher and varying from 13° C. to 16.5° C., and the times being somewhat reduced by reason of the smaller quantity of acids used. About 100 gallons of acid extract or liquor were obtained, which, upon entry into water and distillation with steam, yielded about 92 gallons of water containing about 1.6 gallons of alcoholic material and about 8 gallons of crude water-insoluble alcohols which were found to contain about 5.2 gallons of refined alcoholic material and about 1 gallon of unsaturated hydrocarbon material. About 24 gallons of material non-volatile with steam remained with the dilute sulfuric acid in the hydrolyzing still. The total yield of refined alcoholic material and unsaturated hydrocarbons from both extractions was substantially 88.8 gallons, or about 8.56% of the 1037 gallons of material taken for treatment, and was about 51.9% of the unsaturated content thereof soluble in sulfuric acid of 1.8 sp. gr. The crude alcoholic material was found on redistillation to boil about 25% under 115° C., about 55% between 115° and 150° C., and about 20% above 150° C.

There were about 885 gallons of the Burton rerun gasolene material remaining after the double extraction.

Example 2. About 1140 gallons of light liquid material produced by condensation and compression of petroleum still vapors, boiling under 100° C. and soluble with sulfuric acid of 1.8 sp. gr. to the extent of about 10.2%, were extracted in an apparatus as in Example 1. About 165 gallons of sulfuric acid of 1.8 sp. gr. were slowly introduced into the oil, its addition extending over a period of about two hours, during which time agitation was carried on. The temperature of the contents of the churn varied between about minus 7.5° C. at the beginning of the entry of the acid and 13° C., being controlled by means of the cooling coil. The agitation was continued, after the acid had been run in, for about one-half hour and the material was permitted to settle for about one-half hour after the agitation had been stopped, and the acid extract or liquid was then drawn off from the bottom. The quantity of acid liquor was not measured with accuracy, but it was estimated that about 300 gallons of acid liquor were obtained. It was entered into about 650 gallons of water and upon distillation yielded a condensate of about 105 gallons of crude water-insoluble alcohols and about 100 gallons of water, which latter were found to contain about 5 gallons of alcoholic material. The 105 gallons of crude alcohols were found to contain substantially 84 gallons of refined alcohols and 18.9 gallons of unsaturated hydrocarbon material, giving a total yield (including the unsaturated hydrocarbons) of 107.9 gallons, which was equal to about 9.47% of the hydrocarbon material treated, and about 92.8% of its unsaturated content soluble in 1.8 sulfuric acid. The precise quantity of material nonvolatile with steam at atmospheric pressure which remained in the hydrolyzing still with the dilute acid was not determined, but it was quite small.

The foregoing examples show how alcohols may be produced by sulfation of unsaturated hydrocarbons and replacement of the combined sulfuric acid radical by an OH group. Various other materials of value may be obtained by appropriate treatment of the reactive acid liquor, as, for example, to effect replacement of sulfuric acid by other materials, groups or radicals.

The following example is given to afford an understanding of one of the many replacements which can be made, this particular example illustrating the formation of organic esters by treatment of acid liquor with an alkaline salt of an organic acid, and specifically the treatment of the sulfated material with acetate of lime to produce acetic esters. Other organic esters, as formates, &c., may also be produced.

Example 3. Acid liquor containing 100 parts by weight of unsaturated hydrocarbons of liquefied still vapors and 245 parts of 1.8 $H_2SO_4$ was diluted with 60 parts of water. 275 parts of commercial gray acetate of lime was added, while stirring, to the acid extract, and after standing over night digesting the mixture was distilled. The combined weak acid and oil distillate was neutralized with $Na_2CO_3$ and the acetates were separated from the solution of sodium acetate. 154 parts of crude acetates were recovered, of .840 specific gravity, having a saponification number of 302 and consisting of 70%, or 107.8 parts, of pure acetates calculated as amyl acetate.

It will be seen that by the present invention the known reaction that sulfuric acid is capable of union with an olefine is utilized and applied in an effective and commercial manner to complex hydrocarbon mixtures, such as cracked gasolene, etc., and the unsaturated bodies present in such material, heretofore looked upon as the objectionable or at least the less desirable portion thereof for the normal uses to which gasolene is put, are utilized to yield products of relatively high value. By the present invention it becomes possible not merely to produce alcohols or other products of relatively high value, but such bad gasolene may be treated, according to its properties, to give very substantial or maximum yields of such products of high value, and at the same time a substantial reduction is obtained in the unsaturated hydrocarbon content of the remaining gasolene or other hydrocarbon material.

The expression "cracked petroleum" is made use of in our claims to designate products such as liquid gasolene and the like, and gases and vapors of petroleum obtained by cracking petroleum oils.

Subject matter disclosed but not claimed herein is claimed in our copending applications Serial Nos. 156,197, 176,669, 230,683 and 230,684.

This application is a continuation in part of our earlier filed copending applications Serial Nos. 166,199, 205,895, 210,793, 210,794 and 211,311, prosecution whereof has been terminated in favor of this case and others. Application Serial Number 210,793, above referred to, is a renewal of application Serial Number 23,084, filed April 22, 1915.

We claim:

1. The process of producing a reactive acid liquor from olefines in relatively low concentrations, such as occur in cracked petroleum and the like, which comprises the step of bringing sulfuric acid of about 1.8 sp. gr. into contact with the olefine containing material gradually, so that substantially less than all of the olefines available will react with the acid at any one time, while agitating and cooling the reaction mixture so that the temperature will be maintained under 30° C., allowing the extract to settle and drawing off the extract.

2. The process of producing reactive acid liquor from unsaturated hydrocarbons such as olefines of cracked petroleum and the like when mixed with substantial quantities of liquid hydrocarbons such as paraffins, which comprises treating such mixture with sulfuric acid of a strength equivalent to a specific gravity of less than 1.84 and more than 1.57, while maintaining the temperature below 30° C.

3. The process of producing reactive acid liquor from unsaturated hydrocarbons such as olefines of cracked petroleum and the like which comprises reacting with sulfuric acid of a specific gravity of less than 1.84 and more than 1.57 on a mixture of such olefines and liquid paraffin hydrocarbons, whereby liquid acid extract immiscible with paraffin hydrocarbons is produced, and continuing such reaction until the specific gravity of the extract produced is below 1.5.

4. The process of producing reactive acid extract from unsaturated hydrocarbons of complex mixtures of saturated and unsaturated hydrocarbons which comprises treating same with sulfuric acid of less than 1.84 and more than 1.57 sp. gr. while maintaining the temperature within limits at which fluid sulfated derivatives of unsaturated hydrocarbons are produced to a substantial extent, such temperature limits being sufficiently low to avoid the extensive formation of tars and the like by acid of the strength used, and sufficiently high for the fluid extract produced to be readily separable from residual hydrocarbon material.

5. The process of making reactive acid liquor comprising sulfated derivatives of olefine hydrocarbons which consists in treating olefine hydrocarbons, when mixed with the other components of cracked petroleum, with sulfuric acid under sulfating conditions, whereby olefines are collected by the sulfuric acid and a combination produced which is immiscible with residual hydrocarbons, and substantially separating such combination by gravity separation from residual hydrocarbons, whereby acid liquor is obtained substantially separate from residual hydrocarbons and of reactive character, adapted to produce substantial yields of products of value when reacted upon by a replacing agent for sulfuric acid.

6. The process of producing reactive acid liquor, which comprises treating cracked petroleum, cracked under pressure of less than six atmospheres, with sulfuric aid of about 1.8 sp. gr. while maintaining the temperature below 30° C., whereby a fluid combination is formed between the sulfuric acid and olefines of such cracked petroleum adapted to yield a substantial percentage of secondary alcohols upon hydrolysis.

7. The process of producing reactive acid liquor which comprises treating cracked petroleum containing simple normal olefines with sulfuric acid of about 1.8 sp. gr. while maintaining the temperature below 30° C. whereby a fluid combination is formed between the sulfuric acid and such olefines immiscible in residual hydrocarbons, and separating such combination from the residual hydrocarbons whereby acid liquor is produced adapted to yield substantial percentages of secondary alcohols upon hydrolysis.

8. The process of forming sulfated alkyl compounds, which consists in treating olefine hydrocarbons with sulfuric acid of a strength corresponding to about 1.8 specific gravity in the presence of saturated hydrocarbons, while cooling the mixture.

9. The process of producing products of value from cracked petroleum which comprises the steps of reacting on the olefines of such petroleum while mixed with the other ingredients thereof with sulfuric acid of less than 1.84 and more than 1.57 sp. gr. under sulfating conditions whereby a sulfated extract of the olefines is formed with a minimum formation of sulfonated bodies, separating the sulfated extract from the residual hydrocarbons and reacting on such extract with a replacing agent for sulfuric acid.

10. The process of producing oxygen containing products of value from cracked petroleum which comprises the steps of reacting on the olefines of such petroleum while mixed with the other ingredients thereof with sulfuric acid of less than 1.84 and more than 1.57 sp. gr. under sulfating conditions whereby a sulfated extract of the olefines is formed with a minimum formation of sulfonated bodies, separating the sulfated extract from the residual hydrocarbons and reacting on such extract with an oxygen containing replacing agent for sulfuric acid.

11. The process of producing alcohols from cracked petroleum which comprises the steps of reacting on the olefines of such petroleum while mixed with the other ingredients thereof with sulfuric acid of less than 1.84 and more than 1.57 sp. gr. under sulfating conditions whereby a sulfated extract of the olefines is formed with a minimum formation of sulfonated bodies, separating the sulfated extract from the residual hydrocarbons and reacting thereon with a hydrolyzing agent.

12. The process of producing alcohols from cracked petroleum which comprises the steps of reacting on the olefines of such petroleum while mixed with the other ingredients thereof with sulfuric acid of less than 1.84 and more than 1.57 sp. gr. under sulfating conditions whereby a sulfated extract of the olefines is formed with a minimum formation of sulfonated bodies, separating such extract from the residual hydrocarbons, hydrolyzing with not more than three times as much water as sulfated extract and distilling whereby alcohols are obtained and a residue is left containing sulfuric acid commercially suitable for reconcentration.

13. The process of making monohydric alcohols having more than two carbon atoms and containing only the elements C, H and O from unsaturated hydrocarbons such as olefines of cracked petroleum and the like, which comprises gradually entering sulfuric acid of about 1.8 sp. gr. into liquid paraffin hydrocarbons having such olefines admixed therewith, while maintaining the temperature at under 30° C, and agitating to prevent undesirable local reactions, permitting the acid extract produced to settle, withdrawing same, introducing such acid extract into a quantity of water greater than the quantity of acid extract, distilling and separating the alcohols produced from the remainder of the distillate.

14. The process of making monohydric secondary alcohols and of obtaining olefines in substantially the pure state, which consists in reacting on gasolene containing olefines with sulfuric acid under sulfating conditions, whereby fluid reactive acid extract is produced, substantially separating such extract from residual gasolene and incorporating same with water, distilling, and separating the olefines obtained from the alcohols obtained.

15. The process of producing from cracked hydrocarbons containing olefines reactive acid liquor adapted to give commercial yields of alcohol upon hydrolysis and distillation, in which the hydrocarbons are treated at temperatures below 30° C. with sulfuric acid, the effective strength of which is progressively reduced during the reaction to such extent that sulfuric acid having a strength equivalent to that of aqueous sulfuric acid of specific gravity slightly under 1.84 is reduced in strength until reactive acid liquor of specific gravity below 1.5 is obtained.

16. The method of producing from cracked hydrocarbons containing olefines a reactive acid liquor adapted upon hydrolysis and distillation to give commercial yields of alcohols, accompanied by a minimum of polymerization products, which consists in treating such hydrocarbons with sulfuric acid, the effective strength of which is below that of aqueous sulfuric acid of 1.84 specific gravity but not below a strength adapted for sulfation of the olefines, and continuing such treatment to the production of reactive acid liquor of specific gravity under 1.5, while maintaining the temperature below 30° C. and low enough to prevent the extensive formation of polymerization products.

17. The process of making reactive acid liquor adapted to give commercial yields of alcohol upon hydrolysis and distillation, which consists in reacting with sulfuric acid at a temperature below 30° C. on the olefines of three and more carbon atoms of cracked petroleum material containing olefines, the strength of said sulfuric acid being reduced below that of aqueous sulfuric acid of 1.84 specific gravity by admixture therewith of miscible diluent material, but not below a strength adapted for sulfation of the olefines, thereby forming sulfated derivatives of olefines of three and more carbon atoms which are miscible with and further progressively reduce the strength of the acid, and continuing the extraction to the production of reactive acid liquor of specific gravity below 1.5.

18. The method of increasing the hydrocarbon content of reactive acid liquor obtained by sulfating olefines of cracked petroleum which comprises hydrolyzing a portion of such liquor, distilling to produce alcohols and free olefines, and adding such free olefines to a portion of such liquor.

19. As a new article of manufacture a product consisting of a mixture of monohydric alcohols derived from olefines of cracked petroleum, said olefines having more than two carbon atoms, said product comprising secondary alcohols and being free from ethyl alcohol.

20. A liquid reaction product of sulfuric acid and hydrocarbon material containing olefines and saturated hydrocarbons, a major proportion of which consists of sulfated derivatives of olefines of over two carbon atoms, said product being free from sulfated derivatives of ethylene.

21. A liquid reaction product of sulfuric acid of reactive strength below that of acid of 1.84 specific gravity and hydrocarbon material containing olefines and saturated hydrocarbons, a major proportion whereof consists of sulfated derivatives of olefines of over two carbon atoms, and said product being free from sulfated derivatives of ethylene.

22. A liquid reaction product of sulfuric acid and hydrocarbon material containing olefines and saturated hydrocarbons, a major proportion whereof consists of sulfated derivatives of olefines of over two carbon atoms, which product also comprises a minor proportion of oily polymers and is free from derivatives of ethylene.

23. A reactive acid liquor resulting from the reaction of sulfuric acid on hydrocarbon material containing olefines and saturated hydrocarbons, which as separated by gravity separation from associated immiscible material contains sulfated derivatives of said olefines in proportions to yield, upon hydrolysis, a quantity of alcohols having more than two carbon atoms, which quantity is in excess of 23% by volume of the amount of such reactive acid liquor.

24. Reactive acid liquor comprising a liquid combination of sulfuric acid and unsaturated hydrocarbons of cracked petroleum, cracked under pressure of less than six atmospheres, immiscible with liquid paraffin hydrocarbons, and adapted upon hydrolysis to produce substantial yields of secondary alcohols free from ethyl alcohol and having mainly from 3 to 6 carbon atoms.

25. A product comprising unsaturated ingredients of cracked petroleum or the like combined with sulfuric acid, adapted when hydrolyzed and distilled with live steam, to yield secondary alcohols free from ethyl alcohol and to yield a residue comprising dilute sulfuric acid and a surface layer of material non-volatile with steam at atmospheric pressure.

26. A product comprising unsaturated ingredients of cracked petroleum combined with sulfuric acid, having a specific gravity of 1.5 or under, being substantially immiscible with liquid paraffins and adapted when hydrolyzed and distilled with live steam, to yield a substantial percentage of secondary alcohols, and to yield a residue comprising dilute sulfuric acid and a surface layer of material non-volatile with steam at atmospheric pressure.

27. Reactive acid liquor of specific gravity under 1.5 comprising the product of extraction treatment at a temperature below 30° C. of cracked hydrocarbon material containing olefines of three and more than three carbon atoms with a mixture of sulfuric acid and miscible diluent material of a strength below that of aqueous sulfuric acid of 1.84 specific gravity, but not below a strength adapted for sulfation of said olefines, and adapted upon hydrolysis to give commercial yields of secondary alcohols having three carbon atoms and more than three carbon atoms.

28. A reaction product of cracked hydrocarbon material containing olefines having three carbon atoms and olefines having more than three carbon atoms and sulfuric acid of a strength below that of aqueous sulfuric acid of 1.84 specific gravity, but not below a strength adapted for sulfation of said olefines, which product has a specific gravity below 1.5, contains only a relatively small quantity of polymerization products and is adapted upon hydrolysis and distillation to give yields of alcohols having three carbon atoms and more than three carbon atoms materially greater in amount than the polymerization products.

29. Reactive acid liquor of specific gravity under 1.5 comprising the product of extraction treatment at a temperature below 30° C. of cracked hydrocarbon material containing olefines of three and more than three carbon atoms with a mixture of sulfuric acid and miscible diluent material of a strength below that of aqueous sulfuric acid of 1.84 specific gravity, but not below a strength adapted for sulfation of said olefines, said reactive acid liquor containing sulfated derivatives of said olefines extracted by the sulfuric acid in quantity sufficient together with said miscible diluent material to bring the specific gravity of the reactive acid liquor below 1.5, said reactive acid liquor being adapted upon hydrolysis and distillation to give commercial yields of alcohols having three and more than three carbon atoms.

In testimony that we claim the foregoing, we have hereto set our hands, this 23rd day of April, 1918.

CARLETON ELLIS.
MORTIMER J. COHEN.

Certificate of Correction.

It is hereby certified that in Letters Patent No. 1,486,646, granted March 11, 1924, upon the application of Carleton Ellis, of Montclair, New Jersey, and Mortimer J. Cohen, of New York, N. Y., for an improvement in "Alcohol, Etc., and Processes of Making Same," errors appear in the printed specification requiring correction as follows: Page 2, line 45, for the numeral " 15-20% " read *5-20%;* page 4, line 11, after the word " used " insert a comma; page 6, line 15, for the word " by " read *of;* page 8, lines 11-12, for the word " sufficient " read *efficient;* same page, line 124, for the word " or " read *of;* page 10, line 20, claim 6, for the word " aid " read *acid;* and that the said Letters Patent should be read with these corrections therein that the same may conform to the record of the case in the Patent Office.

Signed and sealed this 6th day of May, A. D. 1924.

[SEAL.]                          KARL FENNING,
*Acting Commissioner of Patents.*